United States Patent
Bruneton et al.

(10) Patent No.: US 12,282,246 B2
(45) Date of Patent: Apr. 22, 2025

(54) CAMERA MODULE CONFIGURED TO INTERACT WITH A FASTENING HOLDER

(71) Applicant: SAFETY TECH, Brignais (FR)

(72) Inventors: Denis Bruneton, Brindas (FR); Romain Tholin, Charbonnieres-les-Bains (FR); Thibault De Bussy, Lyons (FR)

(73) Assignee: SAFETY TECH, Brignais (FR)

( * ) Notice: Subject to any disclaimer, the term of this patent is extended or adjusted under 35 U.S.C. 154(b) by 385 days.

(21) Appl. No.: 17/603,216

(22) PCT Filed: Mar. 31, 2020

(86) PCT No.: PCT/EP2020/059120
§ 371 (c)(1),
(2) Date: May 23, 2022

(87) PCT Pub. No.: WO2020/207860
PCT Pub. Date: Oct. 15, 2020

(65) Prior Publication Data
US 2022/0342279 A1     Oct. 27, 2022

(30) Foreign Application Priority Data
Apr. 12, 2019  (FR) .................................. 1903941

(51) Int. Cl.
*G03B 17/02*    (2021.01)
*G02B 27/00*    (2006.01)
(Continued)

(52) U.S. Cl.
CPC ......... *G03B 17/02* (2013.01); *G02B 27/0006* (2013.01); *G03B 17/55* (2013.01);
(Continued)

(58) Field of Classification Search
CPC ......... G03B 17/02; G03B 30/00; H04N 23/51
See application file for complete search history.

(56) References Cited

U.S. PATENT DOCUMENTS

| | | |
|---|---|---|
| 2017/0036647 A1 | 2/2017 | Zhao et al. |
| 2017/0036650 A1 | 2/2017 | Hester et al. |

(Continued)

OTHER PUBLICATIONS

International Search Report for International Application No. PCT/EP2020/059120; Application Filing Date: Mar. 31, 2020; Date of Mailing: May 19, 2020; with English Translation, 8 pages.

(Continued)

*Primary Examiner* — Minh Q Phan
(74) *Attorney, Agent, or Firm* — CANTOR COLBURN LLP

(57) ABSTRACT

A camera module configured to interact with a fastening holder, the camera module comprising including an image-capturing apparatus provided with an objective and a connecting connector for the transmission of images; a protective casing provided with a protective wall placed facing the objective, and a rear wall opposite the protective wall and lying substantially in a rear plane; a connecting arrangement configured to interact with the fastening holder in a mounted position, the connecting arrangement including a device for blocking the fastening holder in mounted position and a guiding profile for connecting an external connector to the connecting connector, the blocking device and the guiding profile extending beyond the rear plane transversely to the rear plane and in a direction opposite to the protective wall.

20 Claims, 3 Drawing Sheets

(51) Int. Cl.
*G03B 17/55* (2021.01)
*G03B 30/00* (2021.01)
*H04N 23/51* (2023.01)
*H04N 23/54* (2023.01)

(52) U.S. Cl.
CPC ............ *G03B 30/00* (2021.01); *H04N 23/51* (2023.01); *H04N 23/54* (2023.01)

(56) References Cited

U.S. PATENT DOCUMENTS

2018/0152605 A1* 5/2018 Conger ................. H04N 23/54
2019/0039531 A1  2/2019 Wilson

OTHER PUBLICATIONS

Written Opinion for International Application No. PCT/EP2020/059120; Application Filing Date: Mar. 31, 2020; Date of Mailing: May 19, 2020; French Text, 7 pages.

* cited by examiner

CAMERA MODULE CONFIGURED TO INTERACT WITH A FASTENING HOLDER

CROSS REFERENCE TO RELATED APPLICATIONS

This application is a National Stage application of PCT/EP2020/059120, filed on Mar. 31, 2020, which claims the benefit of France Patent Application No. 19/03941, filed on Apr. 12, 2019, both of which are incorporated by reference in their entirety herein.

FIELD OF THE INVENTION

The present invention concerns a camera module configured to cooperate with a mounting bracket and also a vehicle surveillance system comprising at least one camera module.

BACKGROUND

For vehicles, in particular for road vehicles, it is known practice to use camera modules for the driver to monitor zones which are masked from him.

In particular, several camera modules can be used to allow the driver to see the rear of the vehicle, the view blocked by the side post of the passenger compartment and/or to replace the mirrors.

The driver can thus monitor these zones on an internal screen of the vehicle. This camera module system thus gives satisfaction in that it improves driving comfort and safety.

Nonetheless, the integration of one or more camera modules in a vehicle involves a certain number of mechanical, electrical and/or electronic connections.

In this context, it can be tedious to change a defective camera module.

In particular, depending on the location of the defective camera module, the mechanical, electrical and/or electronic connections can be made in different ways and/or with different parts.

Having the necessary parts and/or the knowledge to replace these parts can be problematic.

The present invention aims to resolve all or part of the drawbacks mentioned above.

BRIEF DESCRIPTION

To this end, the present invention concerns a camera module configured to cooperate with a mounting bracket, the camera module comprising a shooting apparatus provided with a lens and a connection socket for transmitting images; a protective housing provided with a protective wall disposed opposite the lens, and with a rear wall opposite the protective wall and extending substantially along a rear plane; a connection arrangement configured to cooperate with the mounting bracket in a mounted position, the connection arrangement comprising a device for blocking the mounting bracket in the mounted position and a guide profile for connecting an external socket to the connection socket, the blocking device and the guide profile extending beyond the rear plane transversely to the rear plane and in a direction opposite to the protective wall.

The guide profile allows easy connection of the camera module to the external socket because the guide profile comes out of the template defined by the protective housing. Likewise, the proximity of the blocking device allows easy mounting of the camera module on the mounting bracket.

It is thus very easy to install the camera module. Regarding maintenance, it is also easy to remove the camera module to replace it with another.

According to one aspect of the invention, the guide profile has an inner profiled surface oriented towards the connection socket. Preferably, the inner profiled surface has grooves and/or ribs for cooperation with the external socket.

This arrangement allows the guide profile to protect the connection socket and also to facilitate connection by acting as a guide for the external socket.

According to one aspect of the invention, the protective wall is transparent. Thus, the lens can obtain a sharp image while being protected.

According to one aspect of the invention, the connection socket is arranged to cooperate with the external socket in a direction of insertion parallel to or coincident with a direction of extension of the guide section.

This arrangement facilitates the connection of the connection socket to the external socket since the relative translation of these parts is guided by complementarity of shape.

According to one aspect of the invention, the guide profile surrounds the connection socket transversely to the direction of extension of the guide profile. Preferably, the guide profile has a closed contour transversely to the direction of extension of the guide profile over a longitudinal portion of the guide profile.

According to one aspect of the invention, the guide profile extends beyond the connection socket in the direction of extension of the guide profile and the direction opposite to the protective wall.

This arrangement makes it possible to protect the connection socket from the external environment.

According to one aspect of the invention, the longitudinal fraction of the profile having a closed contour, surrounds and extends beyond the connection socket in the direction of extension.

According to one aspect of the invention, the guide profile comprises a guide ramp configured to cooperate with the external socket in the direction of insertion.

This arrangement further improves the ease of connection of the connection socket.

According to one aspect of the invention, the guide ramp has a U-shaped profile. Preferably, the U-shaped profile has a hollow oriented towards the connection socket. In particular, the U-shaped profile comprises two substantially parallel branches.

According to one aspect of the invention, the guide ramp further comprises two ends each linked to a corresponding branch and being flared and in continuity with the rest of the guide profile.

According to one aspect of the invention, the camera module further comprises a defrosting system provided with a heating part configured to heat the protective wall and with a power socket formed in or attached to the protective housing so as to be able to cooperate with a complementary power socket in a connection direction transverse to the rear plane.

The connection of the shooting apparatus and the defrosting system are adapted to be connected along substantially parallel axes. This arrangement thus facilitates the positioning of the camera module on the mounting bracket.

According to one aspect of the invention, the complementary power socket is configured to cooperate with the power socket by translation in the connection direction by moving closer to the protective wall.

According to one aspect of the invention, the connection direction is substantially parallel to the direction of insertion.

According to one aspect of the invention, the heating part comprises an electrical resistance. Preferably, the heating part extends substantially parallel to the protective wall. In particular, the heating part has a central opening extending opposite the lens transversely to the protective wall.

According to one aspect of the invention, the camera module further comprises a cleaning system provided with a supply pipe and a cleaning jet deflection device configured to deflect a cleaning jet in an oblique direction with respect to or substantially parallel to the protective wall so as to clean a portion of the outer surface of the protective wall facing the lens.

According to one aspect of the invention, the cleaning jet is a jet of gas and/or liquid and in particular of air and/or water. Preferably, the supply pipe is arranged to cooperate with a connection of a compressed air and/or pressurized water pipe.

This arrangement makes it possible to use the same camera module with either a gas such as air or a fluid such as water. It is therefore possible to be adapted to external conditions, air being preferable in the case of temperatures below 0° C.

According to one aspect of the invention, the protective housing has a passage opening for the supply pipe transversely to the rear plane and in a direction of transverse cleaning connection to the rear plane.

It therefore appears that the connection of the cleaning system is carried out in parallel with those of the deflection system and of the camera. This arrangement thus facilitates the positioning of the camera module on the mounting bracket.

Preferably, the supply pipe extends outside the protective housing towards and/or beyond the rear plane.

According to one aspect of the invention, the cleaning jet deflection device comprises a cooperating element for one end of the supply pipe.

In particular, the direction of cleaning connection is substantially parallel to the direction of connection and/or the direction of insertion.

According to one aspect of the invention, the cleaning jet deflection device is configured to deflect the cleaning jet at an angle substantially right, preferably between 80° and 100° and in particular 90°.

According to one aspect of the invention, the blocking device comprises three removable fixing elements each having an abutment surface configured to cooperate with the mounting bracket, the abutment surfaces extending along a same plane called the removable fixing plane.

The fact of having three removable fixing elements allows a good maintenance in position of the mounting bracket because the mounting bracket cannot pivot about an axis defined by two removable fixing elements.

The removable plane allows the use of a flat mounting bracket such as a sheet metal, which facilitates the design of the mounting bracket. It is also easy to provide a mounting bracket defining a viewing angle of the lens.

According to one aspect of the invention, the removable fixing plane is substantially parallel to the rear plane.

Preferably, the removable fixing elements are non-aligned longitudinally to the rear plane. In particular, the removable fixing elements are arranged around the guide profile. In other words, at least one segment connecting two removable fixing elements pass through the guide profile.

According to one aspect of the invention, each stop surface is formed on the same surface called mounting bracket surface extending along the removable fixing plane.

According to another possibility, each removable fixing element comprises a stud extending transversely to the rear plane, each stud having at one end the corresponding stop surface.

This arrangement makes it possible to define the removable fixing plane using simple constituent elements: the three studs.

According to one aspect of the invention, each removable fixing element comprises a clamping part capable of maintaining cooperation between the corresponding stop surface and the mounting bracket.

According to one aspect of the invention, each clamping part is a screw able to cooperate with a thread formed in the mounting bracket surface or in the corresponding stud.

According to one aspect of the invention, the camera module further comprises a sealing device configured to cooperate with the protective housing and/or the lens so as to delimit a sealed zone in which at least part of the lens is comprised, the sealing device comprising two seals with closed substantially parallel contours and two connecting posts configured to define a determined distance between the two seals.

This arrangement makes it possible to limit the number of parts since the two seals are connected by the two posts.

According to one aspect of the invention, the two seals comprise a first seal configured to cooperate with the protective wall and a second seal configured to cooperate with a shoulder of the lens.

According to one aspect of the invention, the protective housing comprises a front part arranged to cooperate with the protective wall and in which the cleaning jet deflection device is formed.

Preferably, the first seal is arranged to cooperate with the intermediate wedging part and the protective wall so as to seal an internal contact contour between the intermediate wedging part and the protective wall.

According to one aspect of the invention, the camera module comprises an intermediate wedging part arranged to cooperate with two seals of the sealing device and comprising an intermediate wall with two housings configured to receive the two connecting posts.

The intermediate wedging part in combination with the sealing device makes it possible to define a sealed zone of reduced volume relative to the overall volume of the protective housing.

This arrangement thus makes it possible to limit the power of the defrosting system.

According to one aspect of the invention, the intermediate wedging part is arranged to cooperate with the front part by complementarity of shape, the intermediate wall extending in the front part so as to keep the first seal in position against the protective wall.

According to one aspect of the invention, the power socket and/or the passage opening are formed in an external shoulder of the protective housing. Preferably, the external shoulder is provided in the intermediate wedging part. In particular, the external shoulder is disposed between the protective wall and the rear wall transversely to the rear plane.

According to one aspect of the invention, the protective housing comprises a rear part comprising the rear wall. Preferably, the cooperation housing comprises an assembly for maintaining cooperation between the front part, the intermediate part and the rear part. In particular, the holding assembly comprises at least one screw arranged to cooperate with a thread formed in the front part, the rear part and/or the intermediate part.

The present invention also concerns a surveillance system for a vehicle comprising at least one camera module as described above and the mounting bracket configured to cooperate with the at least one camera module.

According to one aspect of the invention, the mounting bracket comprises a through opening configured for the passage of the guide profile in the mounted position.

According to one aspect of the invention, the surveillance system further comprises a device for fixing to a vehicle like a road vehicle such as a device for fixing by screwing.

According to one aspect of the invention, the surveillance system comprises a protective housing in which is formed at least one opening corresponding to the at least one camera module so that the lens of the at least one camera module is opposite the opening.

According to one aspect of the invention, the surveillance system comprises a plurality of camera modules and at least one mounting bracket able to cooperate with the plurality of camera modules. Preferably, each lens of the plurality of camera modules has its own axis of vision distinct from the axes of vision of the other camera modules.

The present invention also concerns a road vehicle comprising a surveillance system with a camera module configured to film an angle of view covering a part hidden by a front post of the vehicle from a driver point of view and at least one camera module configured to film a rear view angle corresponding to a view angle of a side mirror.

The various aspects defined above which are not incompatible can be combined.

BRIEF DESCRIPTION OF THE FIGURES

The invention will be better understood with the aid of the detailed description which is exposed below with reference to the accompanying drawings.

DETAILED DESCRIPTION

Figure 1:
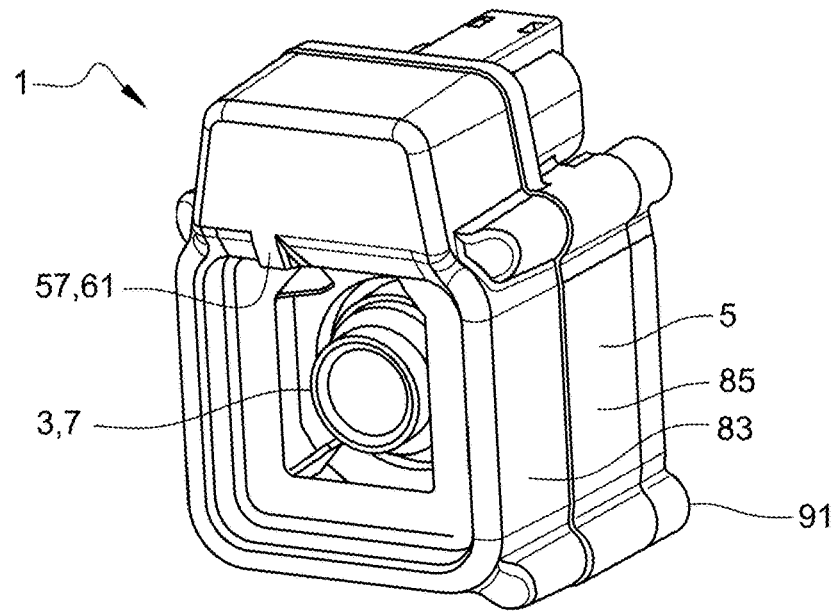
FIG. 1 is a front perspective view of a camera module.
Figure 2:
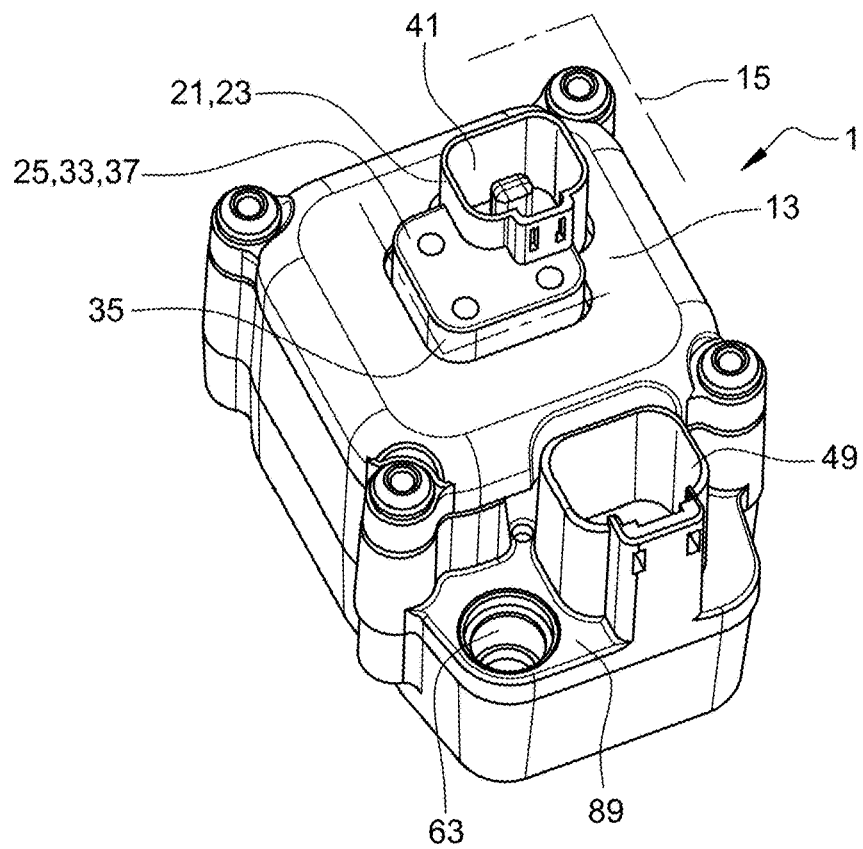
FIG. 2 is a rear perspective view of the camera module.
Figure 3:
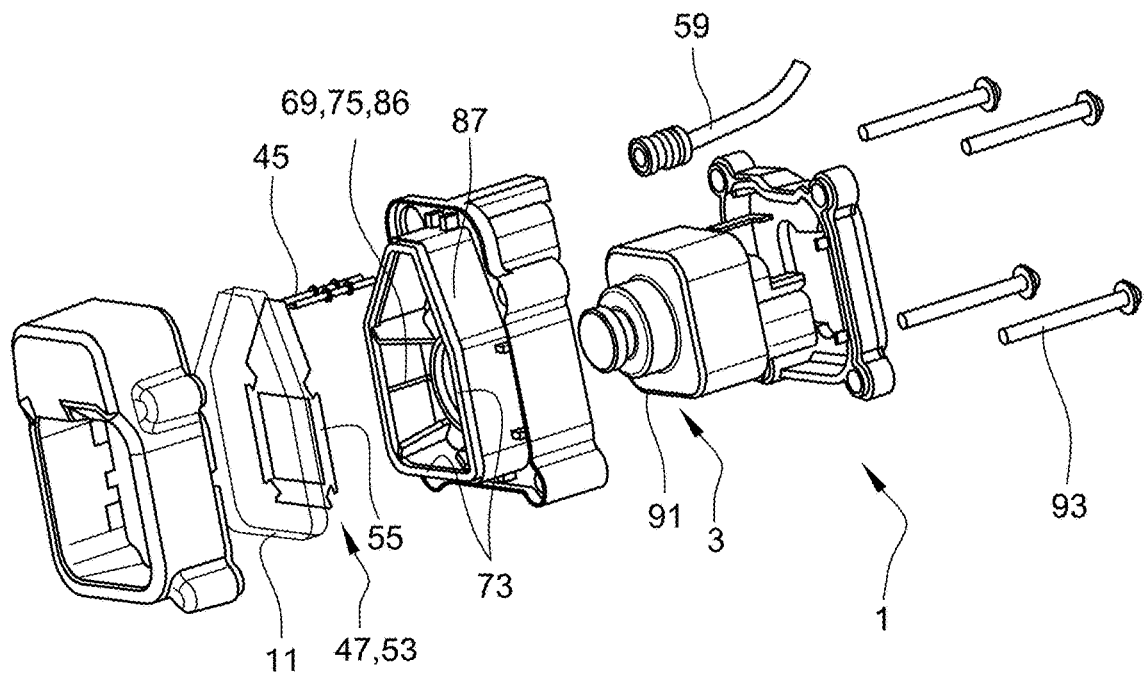
FIG. 3 is an exploded view of the camera module.
Figure 4:
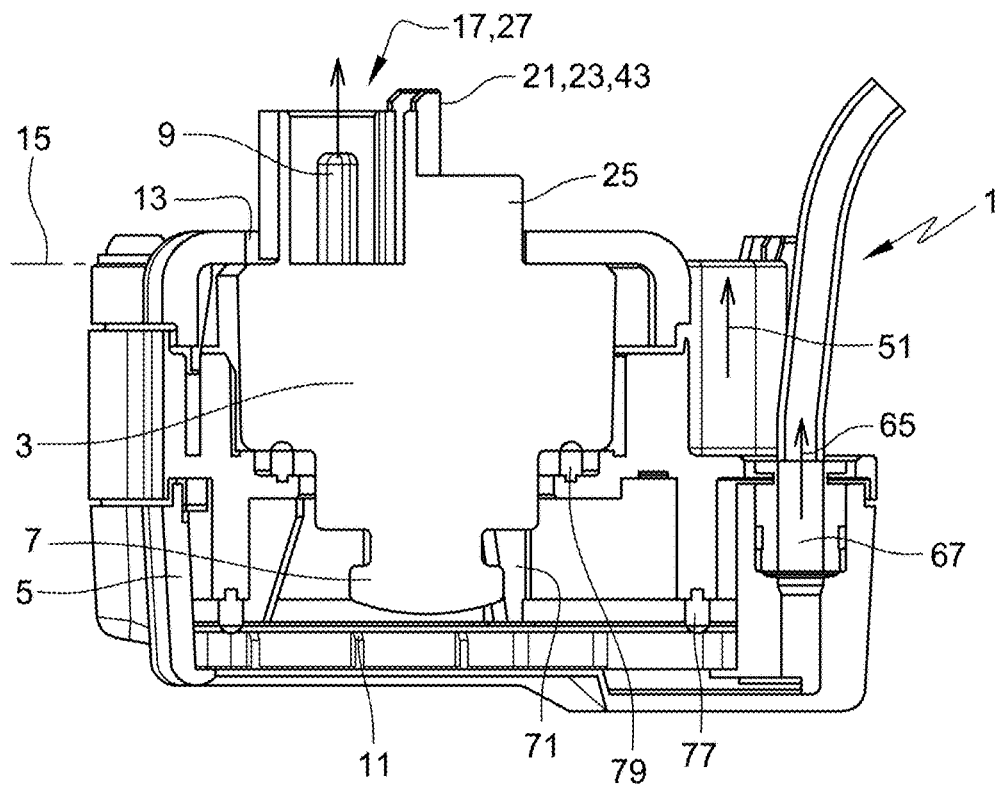
FIG. 4 is a sectional view of the camera module.

In the detailed description which will follow of the figures defined above, the same elements or the elements fulfilling identical functions may retain the same references so as to simplify the understanding of the invention.

As illustrated in FIGS. 1 to 4, a camera module 1 comprises a shooting apparatus and a protective housing 5. The shooting apparatus comprises a lens 7 and a connection socket 9 intended for the transmission of images.

The protective housing 5 comprises a protective wall 11 which is transparent and facing the lens 7. The protective housing 5 comprises a rear wall 13 opposite to the protective wall 11 and extending along a rear plane 15.

The connection socket 9 extends in an insertion direction 17 corresponding to the direction followed by an external socket arranged to cooperate with the connection socket 9.

The camera module 1 comprises a connection arrangement 21 provided with a guide profile 23 and a blocking device 25 for the external socket.

The guide profile 23 extends in an extension direction 27 which coincides with the insertion direction 17.

The guide profile 23 and the blocking device 25 also extend beyond the rear plane 15 transversely to the rear plane 15 and in a direction opposite the protective wall 11.

Figure 5:
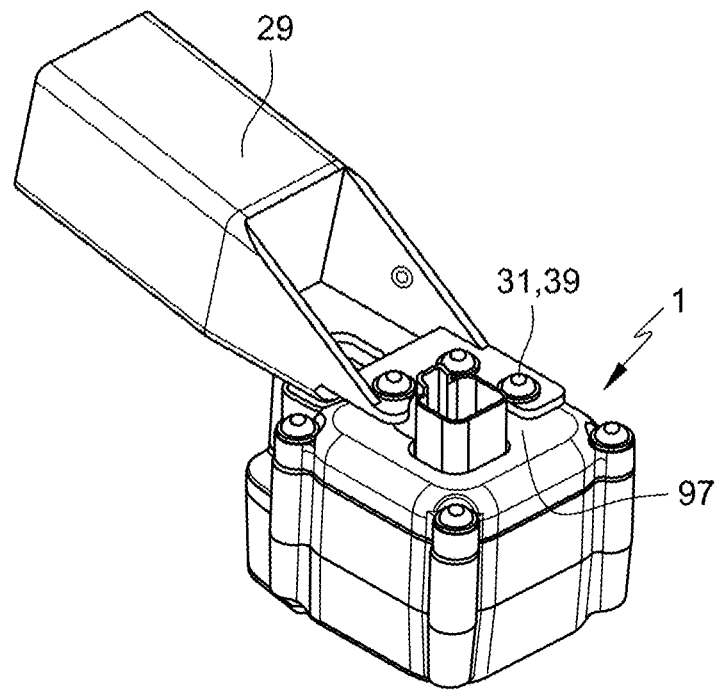
FIG. 5 is a perspective view of the camera module and a mounting bracket.

As illustrated in FIG. 5, the blocking device 25 is arranged to hold in a mounted position a mounting bracket 29. The blocking device 25 comprises three removable fixing elements 31 not aligned longitudinally to the rear plane 15.

The three removable fixing elements 31 are arranged around the guide profile 23, in particular at least one segment connecting two of the removable fixing elements 31 passes through the guide profile 23.

Each removable fixing element 31 has a corresponding abutment surface 33. The three stop surfaces 33 extend along a removable fixing plane 35 substantially parallel to the rear plane 15.

Each stop surface 33 is formed on the same surface called the mounting bracket surface 37 extending along the removable fixing plane 35. Each removable fixing element 31 comprises a clamping part 39 such as a screw configured to cooperate with a thread formed in the mounting bracket surface 37.

The guide profile 23 surrounds the connection socket 9 transversely to the direction of extension 17 according to a closed contour. The guide profile 23 extends further than the connection socket 9 in the direction of insertion 17 and in a direction opposite to the protective wall 11.

The guide profile 23 has an inner profiled surface 41 oriented towards the connection socket 9. The inner profiled surface 41 has grooves and/or ribs for cooperation with the external socket.

The guide profile 23 comprises a guide ramp 43 configured to cooperate with the external socket in the direction of insertion 17. The guide ramp 43 has a U-shaped profile with a hollow oriented towards the connection socket 9, the U-shaped profile comprising two substantially parallel branches.

The guide ramp 43 further comprises two ends each linked to a corresponding branch and being flared and in continuity with the rest of the guide profile 23. The camera module 1 further comprises a defrosting system 45 provided with a heating part 47 configured to heat the protective wall 11 and a power socket 49 formed in or attached to the protective housing 5 so as to be able to cooperate with a complementary power socket in a connection direction 51 transverse to the rear plane 15.

The complementary power socket is configured to cooperate with the power socket 49 for translation in the direction of connection 51 by getting closer to the protective wall 11.

The connection direction 51 is substantially parallel to the insertion direction 17.

The heating part 47 comprises an electrical resistance 53 and extends substantially parallel to the protective wall 11. The heating part 47 has a central opening 55 extending opposite the lens 7 transversely to the protective wall 11.

The camera module 1 further comprises a cleaning system 57 provided with a supply pipe 59 and a cleaning jet deflection device 61 configured to deflect a cleaning jet in an oblique direction with respect to or substantially parallel to the protective wall 11 so as to clean a portion of the outer surface of the protective wall 11 facing the lens 7.

The cleaning jet is a jet of gas and/or liquid and in particular of air and/or water. The supply pipe 59 is arranged to cooperate with a connection of a compressed air and/or pressurized water pipe.

The protective housing 5 has a passage opening 63 for the supply pipe 59 transversely to the rear plane 15 and in a direction of cleaning connection 65 transverse to the rear plane 15.

The supply pipe 59 extends outside the protective housing 5 towards and/or beyond the rear plane 15.

The cleaning jet deflection device 61 comprises a cooperating member 67 for one end of the supply pipe 59.

The cleaning connection direction 65 is substantially parallel to the connection direction 51 and/or the insertion direction 17.

The cleaning jet deflector 61 is configured to deflect the cleaning jet at a substantially right angle.

The camera module 1 further comprises a sealing device 69 configured to cooperate with the protective housing 5 and/or the lens 7 so as to delimit a sealed zone 71.

At least part of the lens 7 is comprised in the sealed zone 71, the sealing device 69 comprising two seals 73 with substantially parallel closed contours and two connecting posts 75 configured to define a determined distance between the two seals 73.

The two seals 73 comprise a first seal 77 configured to cooperate with the protective wall 11 and a second seal 79 configured to cooperate with a shoulder 81 of the lens 7.

The protective housing 5 comprises a front part 83 arranged to cooperate with the protective wall 11 and in which the cleaning jet deflection device 65 is formed.

The first seal 77 is arranged to cooperate with the intermediate wedging part 85 and the protective wall 11 so as to seal an internal contact contour between the intermediate wedging part 85 and the protective wall 11.

The camera module 1 comprises an intermediate wedging portion 85 arranged to cooperate with the two seals 73 of the sealing device 69 and comprising an intermediate wall 87 with two housings 86 configured to receive the two connecting posts 75.

The intermediate wedging part 85 is arranged to cooperate with the front part 83 by complementarity of shape, the intermediate wall 87 extending into the front part 83 so as to keep the first seal 77 in position against the protective wall 11.

The power socket 49 and/or the passage opening 63 are formed in an external shoulder 89 of the protective housing 5. The external shoulder 89 is formed in the intermediate wedging part 85. In particular, the external shoulder 89 is disposed between the protective wall 11 and the rear wall 13 transversely to the rear plane 15.

The protective housing 5 comprises a rear part 91 comprising the rear wall 13. The cooperation housing 5 comprises an assembly for maintaining the cooperation 93 between the front part 83, the intermediate wedging part 85 and the rear part 91.

In particular, the cooperation maintenance assembly 93 comprises at least one screw arranged to cooperate with a thread formed in the front part 83, the rear part 91 and/or the intermediate wedging part 85.

Figure 6:
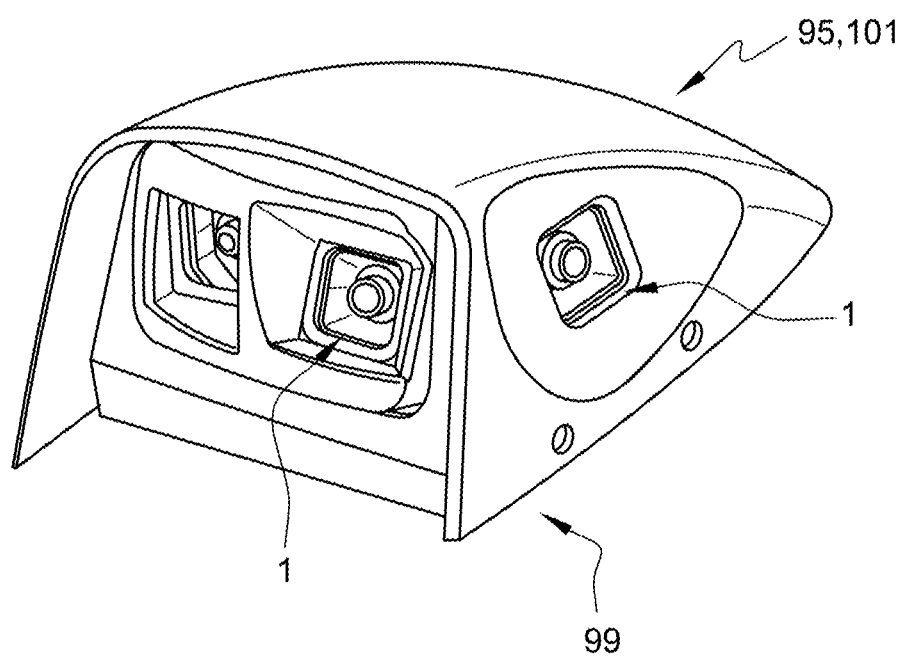
FIG. 6 is a perspective view of a surveillance system comprising three camera modules.

As illustrated in FIG. 6, a surveillance system 95 for a vehicle comprises at least one camera module 1 and the mounting bracket 29 configured to cooperate with at least one camera module 1.

The mounting bracket 29 comprises a through opening 97 configured for the passage of the guide profile 23 in the mounted position.

The surveillance system 95 further comprises a device 99 for fixing to a vehicle like a road vehicle such as a screw fixing device.

The surveillance system 95 comprises a protective housing 101 in which is formed at least one opening corresponding to the at least one camera module 1 so that the lens 7 of the at least one camera module 1 is opposite the opening.

The surveillance system 95 comprises a plurality of camera modules 1 and at least one mounting bracket 29 able to cooperate with the plurality of camera modules 1.

Each lens 7 of the plurality of camera modules 1 has its own axis of vision distinct from the axes of vision of the other camera modules 1.

A road vehicle can thus comprise the surveillance system 95 with a camera module 1 configured to film a viewing angle covering a part hidden by a front side post of the vehicle from the point of view of a driver and at least one camera module configured to film a rear viewing angle corresponding to a viewing angle of a lateral and/or central mirror.

It is thus possible to have a modular system by using one or more camera modules 1. In fact, the assembly and disassembly of a camera module 1 in a surveillance system 95 is easy due to the geometry of the camera module 1.

It is not necessary to have different models of camera modules 1 since the same can be used according to several configurations.

Maintenance is also simplified since it suffices to disconnect the defective camera module 1 and replace it with another.

Moreover, the fact that the camera module 1 has a sealed zone 71 and a cleaning system 57 operating either with water or with air makes it possible to standardize the camera module to several vehicles intended to operate under different conditions.

As goes without saying, the invention is not limited to the only embodiment described above by way of example, it encompasses on the contrary all the variant embodiments thereof.

The invention claimed is:

1. A camera module configured to cooperate with a mounting bracket, the camera module comprising:
    a shooting apparatus provided with a lens and a connection socket for transmitting images;
    a protective housing provided with a protective wall arranged facing the lens, and a rear wall opposite the protective wall and extending substantially along a rear plane; and
    a connection arrangement configured to cooperate with the mounting bracket in a mounted position, the connection arrangement comprising a blocking device of the mounting bracket in the mounted position and a guide profile for connecting an external socket to the connection socket, the blocking device and the guide profile extending beyond the rear plane transversely to the rear plane and in a direction opposite to the protective wall,
    wherein the camera module further comprises a sealing device configured to cooperate with the protective housing and/or the lens so as to delimit a sealed zone in which is comprised at least a part of the lens, the sealing device comprising two seals with substantially parallel closed contours and two connecting posts configured to define a determined distance between the two seals.

2. The camera module according to claim 1, wherein the connection socket is arranged to cooperate with the external socket in an insertion direction parallel to or coincident with an extension direction of the guide profile.

3. The camera module according to claim 2, wherein the guide profile extends beyond the connection socket in the extension direction of the guide profile and the direction opposite to the protective wall.

4. The camera module according to claim 2, wherein the guide profile comprises a guide ramp configured to cooperate with the external socket in the insertion direction.

5. The camera module according to claim 1, further comprising a cleaning system provided with a supply pipe and a cleaning jet deflection device configured to deflect a cleaning jet in an oblique direction with respect to or substantially parallel to the protective wall so as to clean a portion of an outer surface of the protective wall facing the lens.

6. The camera module according to claim 5, wherein the protective housing has a passage opening for the supply pipe transverse to the rear plane and in a direction of cleaning connection transverse to the rear plane.

7. The camera module according to claim 1, wherein the blocking device comprises three removable fixing elements each having a stop surface configured to cooperate with the mounting bracket, each stop surface extending along the same plane called a removable fixing plane.

8. The camera module according to claim 1, further comprising an intermediate wedging portion arranged to cooperate with two seals of the sealing device and comprising an intermediate wall with two housings configured to receive the two connecting posts.

9. A surveillance system for a vehicle comprising at least one camera module according to claim 1 and the mounting bracket configured to cooperate with the at least one camera module.

10. The camera module according to claim 1, further comprising a defrosting system provided with a heating part configured to heat the protective wall and a power socket formed in or attached to the protective housing so as to be able to cooperate with a complementary power socket in a connection direction transverse to the rear plane.

11. The camera module according to claim 4, further comprising a cleaning system provided with a supply pipe and a cleaning jet deflection device configured to deflect a cleaning jet in an oblique direction with respect to or substantially parallel to the protective wall so as to clean a portion of an outer surface of the protective wall facing the lens.

12. The camera module according to claim 11, wherein the protective housing has a passage opening for the supply pipe transverse to the rear plane and in a direction of cleaning connection transverse to the rear plane.

13. The camera module according to claim 12, wherein the blocking device comprises three removable fixing elements each having a stop surface configured to cooperate with the mounting bracket, each stop surface extending along the same plane called a removable fixing plane.

14. The camera module according to claim 2, further comprising a cleaning system provided with a supply pipe and a cleaning jet deflection device configured to deflect a cleaning jet in an oblique direction with respect to or substantially parallel to the protective wall so as to clean a portion of an outer surface of the protective wall facing the lens.

15. The camera module according to claim 14, wherein the protective housing has a passage opening for the supply pipe transverse to the rear plane and in a direction of cleaning connection transverse to the rear plane.

16. The camera module according to claim 15, wherein the blocking device comprises three removable fixing elements each having a stop surface configured to cooperate with the mounting bracket, each stop surface extending along the same plane called a removable fixing plane.

17. The camera module according to claim 2, further comprising a defrosting system provided with a heating part configured to heat the protective wall and a power socket formed in or attached to the protective housing so as to be able to cooperate with a complementary power socket in a connection direction transverse to the rear plane.

18. The camera module according to claim 17, wherein the complementary power socket is configured to cooperate with the power socket by translation in the connection direction by getting closer to the protective wall.

19. The camera module according to claim 17, wherein the connection direction is substantially parallel to the insertion direction.

20. The camera module according to claim 18, wherein the connection direction is substantially parallel to the insertion direction.

* * * * *